(12) United States Patent
Tamagawa et al.

(10) Patent No.: US 6,985,268 B1
(45) Date of Patent: Jan. 10, 2006

(54) IMAGE CAPTURING APPARATUS

(75) Inventors: Yasuhisa Tamagawa, Tokyo (JP);
Takayuki Nakano, Tokyo (JP);
Shigeru Makino, Tokyo (JP); Shuji Urasaki, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 552 days.

(21) Appl. No.: 09/979,117

(22) PCT Filed: May 30, 2000

(86) PCT No.: PCT/JP00/03471

§ 371 (c)(1),
(2), (4) Date: Nov. 19, 2001

(87) PCT Pub. No.: WO01/92956

PCT Pub. Date: Dec. 6, 2001

(51) Int. Cl.
*H04N 1/04* (2006.01)

(52) U.S. Cl. .................. 358/475; 358/480; 358/481

(58) Field of Classification Search ............... 358/475, 358/476, 480, 481, 482, 484
See application file for complete search history.

(56) References Cited

U.S. PATENT DOCUMENTS

| | | | |
|---|---|---|---|
| 4,037,943 A | 7/1977 | Anzai | |
| 4,620,790 A * | 11/1986 | Hufnagel | .................. 356/124 |
| 4,988,858 A | 1/1991 | Pinson | |
| 5,619,382 A | 4/1997 | Kato et al. | |
| 5,760,979 A | 6/1998 | Saito | |

FOREIGN PATENT DOCUMENTS

| | | |
|---|---|---|
| EP | 0 872 752 A | 10/1998 |
| EP | 0 898 190 A2 | 2/1999 |
| EP | 1 160 610 A | 12/2001 |
| JP | 62-164010 A | 7/1987 |
| JP | 3-198007 A | 8/1991 |
| JP | 5-288899 A | 11/1993 |
| JP | 10-10428 | 1/1998 |

OTHER PUBLICATIONS

Wenske, Kurt: "Spiegeloptik" 1988, Verlag Sterne und Weltraum Dr. Vehrenberg GMBH, p. 76.
Review of Scientific Instruments, 62, May 1991, No. 5, pp. 1293-1298, "A 94 GHz differential radiometer for observations of diffuse sky emission," L. Piccirillo.
Annalen Der Physik, vol. 10, 1952, pp. 94-114, XP009042602, "Spiegelsysteme streifenden Einfalls als abbildende Optiken für Röntgenstrahlen," Von Hans Wolter.

* cited by examiner

*Primary Examiner*—Mark Wallerson
(74) *Attorney, Agent, or Firm*—Birch, Stewart, Kolasch & Birch, LLP

(57) ABSTRACT

Disclosed is an image capturing apparatus comprising a primary mirror 1 that has a surface which is a section of a surface cut out from a paraboloid with a single focus; a secondary mirror 2 that has a surface which is a section of a surface cut out from a hyperboloid with two foci; and a photodetector 3 which converts the light signal coming from the secondary mirror 2 into an electric signal. The secondary mirror 2 is placed in a position where one of its foci and the focus of the primary mirror 1 match with each other. The photodetector 3 is placed near the other focus of the secondary mirror 2. By using two mirrors, the light from the object is led to the photodetector 3 without being shaded.

10 Claims, 4 Drawing Sheets

|  | COEFFICIENTS OF PRIMARY MIRROR | COEFFICIENTS OF SECONDARY MIRROR |
|---|---|---|
| RADIUS OF CURVATURE | -600.92 | 144.66 |
| CONIC COEFFICIENT | -32.53 | 0.762 |
| $2R^2-1$ | -7.82E-3 | 6.71E-3 |
| $R^2\cos 2\theta$ | -2.05E-3 | -1.16E-2 |
| $R^2\sin 2\theta$ | 7.80E-11 | 1.64E-10 |
| $R^3\cos 3\theta$ | 1.31E-12 | -4.28E-14 |
| $R^3\sin 3\theta$ | -8.62E-13 | -1.53E-12 |
| $(3R^2-2)R\cos\theta$ | 9.77E-7 | 2.06E-4 |
| $(3R^2-2)R\sin\theta$ | 3.61E-5 | 1.29E-4 |

|  | COEFFICIENTS OF PRIMARY MIRROR | COEFFICIENTS OF SECONDARY MIRROR |
|---|---|---|
| RADIUS OF CURVATURE | -183.19 | -132.33 |
| CONIC COEFFICIENT | -1.00 | -4.20 |

IMAGE CAPTURING APPARATUS

This application is the national phase under 35 U.S.C. § 371 of PCT International Application No. PCT/JP00/03471 which has an International filing date of May 30, 2000, which designated the United States of America.

TECHNICAL FIELD

The present invention relates to an image capturing apparatus for capturing an optical image of an object. More particularly, this invention relates to the image capturing apparatus which can capture images of the object over a wide wavelength region from ultraviolet to infrared.

BACKGROUND ART

Lenses utilizing the phenomenon of refraction of light are made from transparent optical material. As a result, the wavelength region for which these lenses can be used is limited by the optical characteristics of the optical material from which they are made. Moreover, these lenses can only be used over wavelength regions in which light can be transmitted, and even in these regions, chromatic aberration occurs due to dispersion arising from wavelength characteristics of refractive index.

On the contrary, a mirror utilizing the phenomenon of reflection of light can be used over a wide wavelength region without having the above chromatic aberration. Reflective surface made of metals such as aluminum, silver, and gold have high reflectance over a wide wavelength region from ultraviolet to infrared.

On the other hand, when a single mirror is used, aberration can be reduced over a very narrow range near a particular point (for instance, a point where optical axis and image plane intersect), however, at points away from the point for example, aberration (for instance, asymmetrical aberration such as coma aberration and astigmatism) become greater. Therefore, although light incoming from a particular direction can be condensed, light incoming from an object of a certain size, that is, an incident light having a certain angle range cannot form an image.

At least two mirrors are required to capture an optical image of an object. As the number of mirrors increases there are more chances of generation errors in production or assembly of an image capturing apparatus. Therefore, increasing the number of mirrors is not practical. Therefore, it is preferable that the image capturing apparatus is provided with the minimum required number of mirrors, i.e. two. However, increasing the number of mirrors increases design freedom, and can improve the image formation performance over a broader angle range.

The examples of conventional image capturing apparatus with two mirrors are Cassegrain-type, Ritchey-Chretien-type, and Gregorian-type image capturing apparatuses as mentioned in the book "Hansha-bo-enkyo (reflection-type telescopes)", written by Yamashita, Yasumasa (University of Tokyo Press, 1992, p. 115). FIG. 7 represents the structures of the Cassegrain-type and Ritchey-Chretien-type image capturing apparatuses.

For example, when FIG. 7 represents the Cassegrain-type image capturing apparatus, the numeral 101 represents a parabolic primary mirror (with an aperture in this example), and the numeral 102 represents a hyperbolic secondary mirror (with an axis of revolution identical to that of the primary mirror 101). The numeral 103 indicates a photodetector positioned near the object image formed by the primary mirror 101 and the secondary mirror 102.

In the Cassegrain-type image capturing apparatus, the primary mirror 101 and the secondary mirror 102 are rotationally symmetrical in structure enabling the production using a turning lathe. The forms and the placement of the primary mirror 101 and the secondary mirror 102 are determined so that under the condition in which spherical aberration can be eliminated, other aberration can be reduced in well balance. The photodetector 103 is, for example, a film, a CCD or the like which converts light intensity distribution into electric signals.

On the other hand, when FIG. 7 represents the Ritchey-Chretien-type image capturing apparatus, the numeral 101 represents a hyperbolic primary mirror, the numeral 102 represents a hyperbolic secondary mirror, and the numeral 103 indicates a photodetector placed near the object image formed by the primary mirror 101 and the secondary mirror 102.

In the Ritchey-Chretien-type image capturing apparatus, axis of revolution of the secondary mirror 102 is identical to that of the primary mirror 101, like in the Cassegrain-type image capturing apparatus. The forms and the placement of the primary mirror 101 and the secondary mirror 102 are determined so that under the condition in which spherical aberration and coma aberration of aberration can be eliminated, other aberration can be decreased in well balance.

FIG. 8 shows the structure of a Gregorian-type image capturing apparatus. In FIG. 8, the numeral 111 represents a parabolic primary mirror (with an aperture herein), the numeral 112 represents an ellipsoidal secondary mirror (wherein its axis of revolution is identical to that of the primary mirror 111), and the numeral 113 indicates a photodetector placed near the object image formed by the primary mirror 111 and the secondary mirror 112.

In the Gregorian-type image capturing apparatus, the light incoming from the object first forms an image after it reflects from primary mirror 111, and then is focused into an image again by the secondary mirror 112. The forms and the placement of the primary mirror 111 and the secondary mirror 112 are determined so that under the condition in which spherical aberration can be eliminated, other aberration can be reduced in well balance, like in the Cassegrain-type image capturing apparatus.

However, the conventional image capturing apparatuses with two mirrors mentioned in the above reference can only reduce aberration over a very narrow field of view and the angle range of the object is very small as it is obvious from the fact that these are image capturing apparatuses both used as telescopes. In other words, when image capturing is to be done over a wide field of view, the periphery of the image becomes blurred. Therefore, a clear image cannot be obtained.

Moreover, in the conventional image capturing apparatuses with two mirrors, the light from the object is shielded by the secondary mirror before it reaches the primary mirror, undergoing a problem known as vignetting. Therefore there is a loss of luminous energy and the image becomes blurred due to diffraction.

In the light of the above, it is an object of this invention to provide an image capturing apparatus with two mirrors in which a clear image can be obtained without vignetting even when an image of the object is captured over a wide field of view.

DISCLOSURE OF THE INVENTION

The image capturing apparatus according to one aspect of the present invention comprises a primary mirror that has a surface which is a section of a surface cut out from a paraboloid and having a single focus; a secondary mirror that has a surface which is a section of a surface cut out from a hyperboloid and having two foci. Moreover, there is provided a photodetector which converts the light signal coming from the secondary mirror into an electric signal. The secondary mirror is placed in such a manner that one of its foci, and the focus of the primary mirror match with each other. The photodetector is placed near the other focus of the secondary mirror.

According to the above-mentioned aspect of the present invention, by having the primary mirror as well as the secondary mirror, aberration are reduced over a very wide field of view and angle range of the object to be image-captured can be greatly broadened. In other words, even when image capturing is done over a wide field of view, the perimeter of the image does not become blurred and a clear image can be obtained. Moreover, unlike the conventional apparatuses, as the light coming from the object is not shielded by the secondary mirror before it reaches the primary mirror, there are no vignetting and no loss of luminous energy.

In an image capturing apparatus according to another aspect of this invention, the primary mirror or the secondary mirror has a surface, or both the primary and secondary mirrors have surfaces, with an aspheric component of third or higher order.

According to the above-mentioned aspect of the present invention, as deformation of high order is caused, and surface of the mirror is made into a general aspheric surface, aberration can be reduced with higher precision.

An image capturing apparatus according to still another aspect of this invention comprises a primary mirror having a surface which is not rotationally symmetrical and can be expressed by a Zernike polynomial; and a secondary mirror having a surface which is not rotationally symmetrical and can be expressed by a Zernike polynomial. Moreover, a photodetector, which converts the light signal from the secondary mirror into electric signal, is provided. The primary and the secondary mirrors are positioned in such a manner that the angles of both mirrors in relation to incident angle are 45 degrees and the photodetector is positioned near the focus of the secondary mirror.

According to the above-mentioned aspect of the present invention, by having the primary mirror as well as the secondary mirror, aberration can be reduced over a very wide field of view and angle range of the object to be image-captured can be greatly broadened. In other words, even when image capturing is done over a wider field of view, the perimeter of the image does not become blurred, and a clear image can be obtained. Moreover, unlike the conventional apparatuses, as the light coming from the object is not shielded by the secondary mirror before it reaches the primary mirror, there is no vignetting and no loss of luminous energy.

In an image capturing apparatus according to still another aspect of this invention, any one of the primary mirror and the secondary mirror has a surface which can be expressed by a Zernike polynomial, and the other one has a surface which is a section of a surface cut out from a quadric surface of revolution.

According to the above-mentioned aspect of the present invention, by making one of the mirrors to have a surface, which can be expressed by a Zernike polynomial, while causing a deformation of high order to the other mirror as well as making the latter mirror into a general aspheric surface, aberration can be reduced in even higher precision.

BEST MODE FOR CARRYING OUT THE INVENTION

The present invention will be explained in detail while reference to the accompanying drawings.

Figures 1, 2:
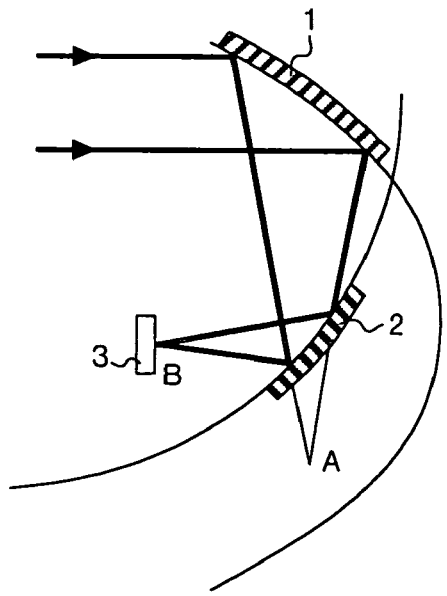
FIG. 1 illustrates the configuration of the image capturing apparatus according to a first embodiment of the present invention.
FIG. 2 shows the parameters of mirror surfaces according to the first embodiment, which are used for the calculation of performance comparison.

Firstly, configuration of first embodiment will be explained. FIG. 1 shows the configuration of first embodiment of the image capturing apparatus according to the present invention.

In FIG. 1, the numeral 1 represents a primary mirror that has a surface that is a section of a surface cut out from a paraboloid. The paraboloid has a single focus. The numeral 2 indicates a secondary mirror that has a surface that is a section of a surface cut out from a hyperboloid with an axis of revolution different from that of the primary mirror 1. This hyperboloid has two foci and one of the foci of the secondary mirror 2 (point A) is positioned so that it matches with the focus of the primary mirror 1. The numeral 3 indicates a photodetector placed on the object side in relation to the secondary mirror 2 and near the other focus of the secondary mirror 2 (point B). On the surface of revolution having two foci, the light coming from an object is focused into point A as a virtual image by the primary mirror 1 and an image is formed near the photodetector 3 by the secondary mirror.

Therefore, in the image capturing apparatus according to the first embodiment, the light from the object reaches the photodetector without being shielded because of the provision of the above configuration.

Although the primary mirror 1 and the secondary mirror 2 have forms of a section of a surface cut out from a surface of revolution which are not rotationally symmetrical, their materials can be used efficiently by applying computer-controlled high-precision-processing technology.

The performance of the image capturing apparatus according to the first embodiment will be compared to the conventional image capturing apparatuses. FIG. 2 shows the parameters of mirror surfaces used in the calculation of performance comparison where the angle difference between the axes of rotation is 56 degrees.

Figure 3:
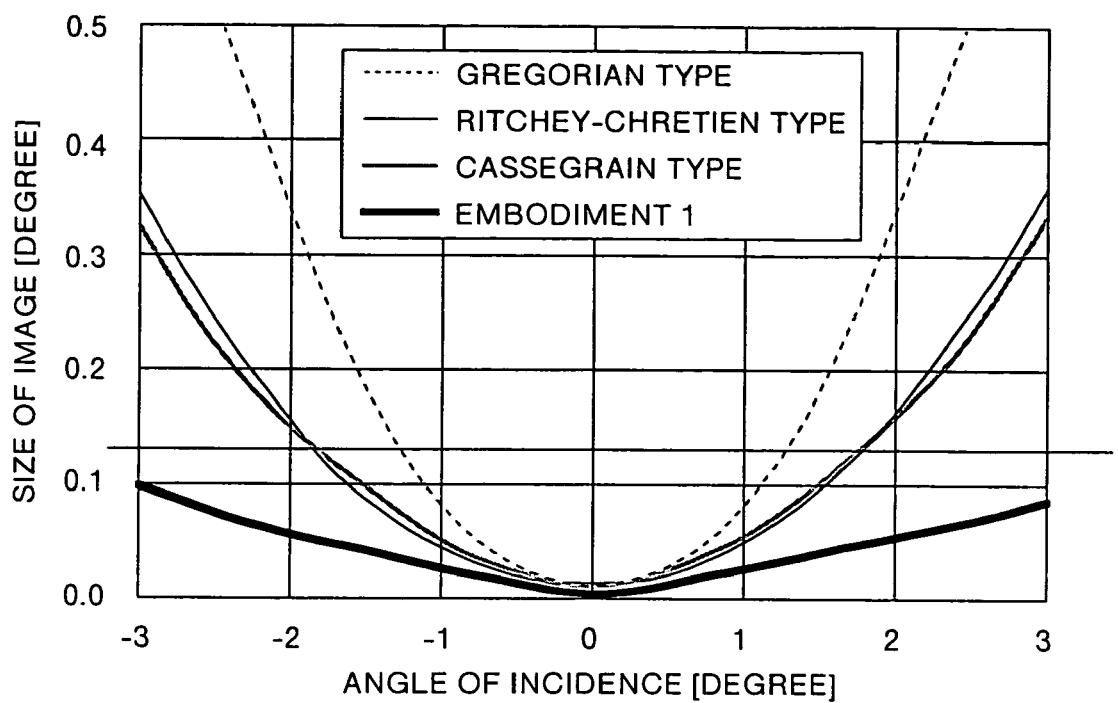
FIG. 3 represents the size of image, which can be captured with the image capturing apparatus according to the first embodiment and with conventional image capturing apparatuses.

FIG. 3 indicates the size of the image, which can be captured with the image capturing apparatus according to first embodiment and with the conventional image capturing apparatuses. The horizontal axis represents the angle of incidence (angle of view field) and the vertical axis shows the diameter of the image containing luminous energy of 80%. In the calculation, the wavelength of light λ and the F-number were assumed to be 1 μm and 4.0 respectively.

Thus, according to the first embodiment, in contrast to the conventional image capturing apparatuses, by having the two mirrors (represented by the primary mirror 1 and the secondary mirror 2) aberration can be reduced over a very wide field of view and angle range of the object to be image-captured can be greatly broadened. In other words, a clear image can be obtained without the perimeter of the image becoming blurred even when image capturing is done over a wide field of view (as shown in FIG. 3).

Moreover, according to the first embodiment, in contrast to the conventional image capturing apparatuses, as the light coming from the object is not shielded by the secondary mirror 2 before it reaches the primary mirror 1, there are no vignetting and no loss of luminous energy. Furthermore, the image does not become blurred due to diffraction.

Although the primary mirror 1 has an aperture in this first embodiment, the structure should not be restricted to this case. For example, the secondary mirror 2 may have an aperture instead, or an aperture stop may be placed either in front of the primary mirror 1, between the primary mirror 1 and the secondary mirror 2, or behind the secondary mirror 2.

It is well known that by causing a deformation of higher order terms than second order to a mirror and making it into a general aspheric surface, aberration can be reduced. Accordingly, for example, the primary mirror 1 may have a surface with an aspheric component of third or higher order, which are minutely deformed from those of a paraboloid, or the secondary mirror may have a surface with an aspheric component of $3^{rd}$ order or higher order which is minutely deformed from those of a hyperboloid.

Figure 4:
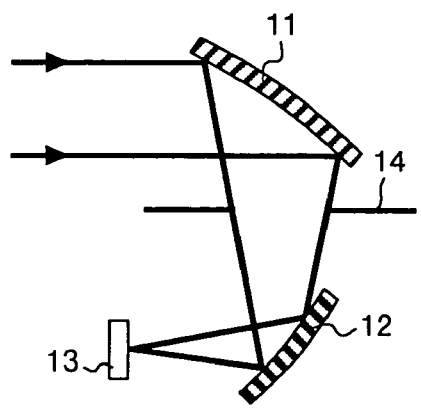
FIG. 4 illustrates the configuration of the image capturing apparatus according to a second embodiment of the present invention.

FIG. 4 illustrates the configuration of an image capturing apparatus of a second embodiment in accordance with the present invention. The numeral 11 represents a primary mirror, which is not rotationally symmetrical and can be expressed by a Zernike polynomial while the numeral 12 represents a secondary mirror 2, which is not rotationally symmetrical and can be expressed by a Zernike polynomial as well. The numeral 13 is a photodetector placed on the side of the object in relation to the secondary mirror 12, and the numeral 14 indicates an aperture stop, which limits the light coming from the object.

The Zernike polynomials express radial coordinates covering a unit circle with R and θ. For example, a polynomial of n-th order can be expressed by equation (1). In the equation, n and m are positive even numbers greater than 0.

$$Z_{n,m}(R) = \exp[im\theta] \sum_{s=0}^{(n-m)/2} \frac{(n-s)!}{s!\left(\frac{n+m}{2}-s\right)!\left(\frac{n-m}{2}-s\right)!} R^{n-2s} \quad (1)$$

Figures 5, 6:
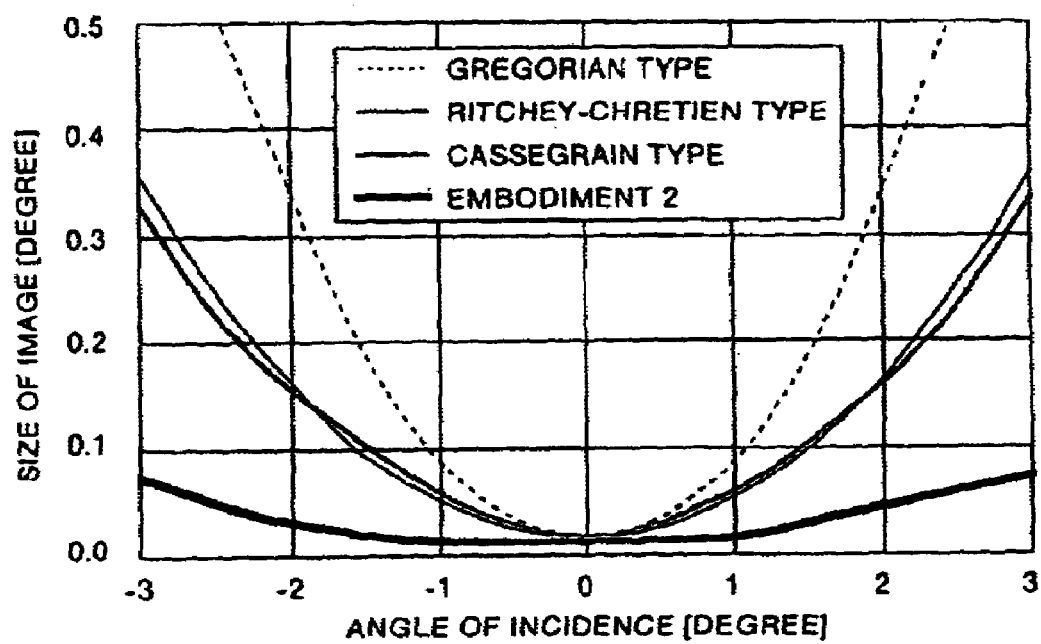
FIG. 5 shows the parameters of mirror surfaces according to the second embodiment, which are used for the calculation of performance comparison.
FIG. 6 represents the size of image, which can be captured with the image capturing apparatus according to the second embodiment and with the conventional image capturing apparatuses.
Figure 7:
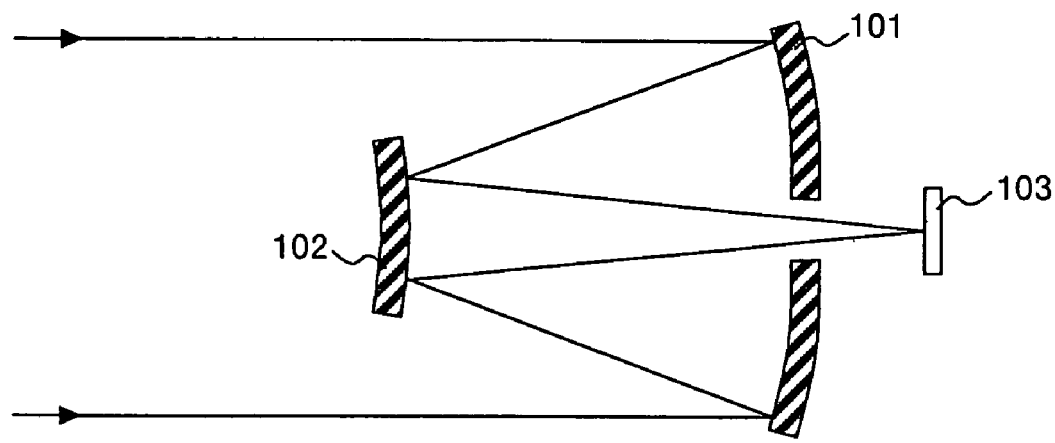
FIG. 7 illustrates the configuration of Cassegrain as well as Ritchey-Chretien-type image capturing apparatuses.
Figure 8:
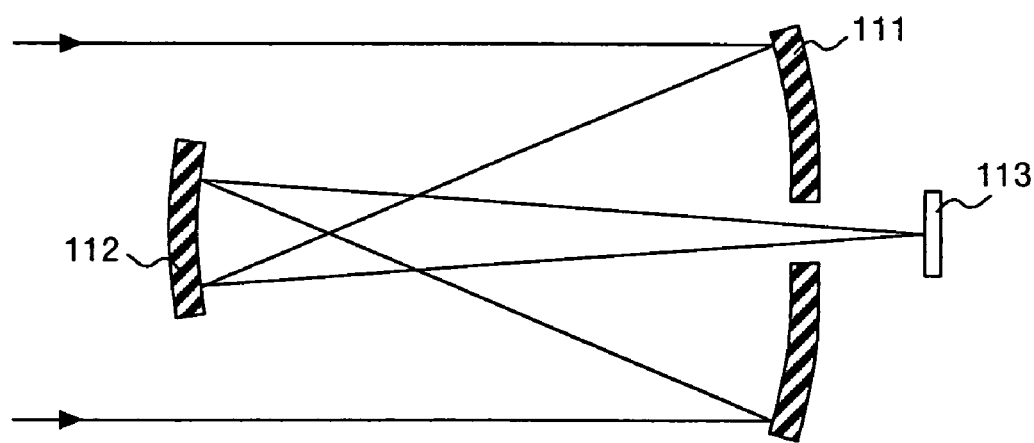
FIG. 8 shows the configuration of Gregorian-type image capturing apparatus.

The performance of the image capturing apparatus of the second embodiment according to the present invention will now be compared to the conventional apparatuses. FIG. 5 shows the parameters of mirror surfaces used in the calculation of performance comparison. The angles of the mirrors in relation to incident light are 45 degrees respectively.

FIG. 6 indicates the size of image that can be captured with the image capturing apparatuses of the second embodiment according to the present invention and with the conventional apparatuses. The horizontal axis shows the angle of incidence (angle of view field), and the vertical axis represents the diameter of image containing luminous energy of 80%. In the calculation, the wavelength of light λ and the F-number were assumed to be 1 μm and 4.0 respectively.

Thus in the second embodiment, in contrast to the conventional image capturing apparatuses, by having the two mirrors (represented by the primary mirror 11 and the secondary mirror 12), aberration can be reduced over a very wide field of view and the angle range of the object to be image-captured can be greatly broadened. In other words, a clear image can be obtained without the perimeter of the image becoming blurred even when image capturing is done over a wide field of view (as shown in FIG. 6).

Moreover, according to the second embodiment, in contrast to the conventional image capturing apparatuses, as the light coming from the object is not shielded by the secondary mirror 12 before it reaches the primary mirror 11, there is no vignetting and no loss of luminous energy. Furthermore, the image does not become blurred due to diffraction.

Although there is an aperture stop 14 between the primary mirror 11 and the secondary mirror 12, the structure should not be restricted to this case. For example, there may be an aperture stop in front of the primary mirror 11, or behind the secondary mirror 12, or either the primary mirror 11 or the secondary mirror 12 may have an aperture.

In addition, in the second embodiment, although the number of terms in the Zernike polynomials used for the primary mirror 11 and the secondary mirror 12 were up to three, the terms should not be limited to this case. For example, terms of order higher than three may be used. When a term of high order is used, the size of image can be decreased further.

In the second embodiment, although both the primary mirror 11 and the secondary mirror 12 each has a surface expressed by Zernike polynomials, the surface need not be limited to this type. For example, one of the mirrors may have a surface expressed with a Zernike polynomial while the other may have a surface that is a section of a surface cut out from a quadric surface of revolution. Moreover, an aspheric term of high order may be added to the quadric surface of revolution.

Furthermore, in the second embodiment, although parameters of mirror surfaces not rotationally symmetrical are expressed by the generally well-used Zernike polynomials, the same effects shall be provided when the Zernike polynomials are replaced by other functions. In the above explanation, a wavelength of 1 μm was used as an example, but the same effects will be provided over other regions of wavelength.

INDUSTRIAL APPLICABILITY

As explained above, the image capturing apparatus according to the present invention is useful for capturing an image of a distant object over a narrow field of view like a telescope and for capturing an image of a large object over a wide field of view. In particular, the image capturing apparatus is suitable for IR camera optical systems to capture an image of a comparatively large object over a wide field of view.

What is claimed is:

1. An image capturing apparatus comprising:
a primary mirror that has a surface which is a section of a surface cut out from a paraboloid and having a single focus;
a secondary mirror that has a surface which is a section of a surface cut out from a hyperboloid and having two foci; and
a photodetector which converts the light signal coming from the secondary mirror into an electric signal,
wherein said secondary mirror is placed in such a manner that one of its foci and the focus of said primary mirror match with each other, and
said photodetector is placed near the other focus of said secondary mirror.

2. The image capturing apparatus according to claim 1, wherein said primary mirror or said secondary mirror has a surface, or both said primary and secondary mirrors have surfaces, with an aspheric component of third or higher order.

3. The image capturing apparatus of claim 1, wherein the primary mirror is unsegmented.

4. An image capturing apparatus comprising:
a primary mirror having a surface which is not rotationally symmetrical and can be expressed by a Zernike polynomial;
a secondary mirror having a surface which is not rotationally symmetrical and can be expressed by a Zernike polynomial; and
a photodetector which converts the light signal from the secondary mirror into electric signal,
wherein said primary and secondary mirrors are positioned in such a manner that the angles of each mirror in relation to incident light is 45 degrees, and
said photodetector is positioned near the focus of the secondary mirror.

5. The image capturing apparatus according to claim 4, wherein any one of said primary mirror and the secondary mirror has a surface which can be expressed by a Zernike polynomial, and the other one has a surface which is a section of a surface cut out from a quadric surface of revolution.

6. The image capturing apparatus of claim 4, wherein the primary mirror is unsegmented.

7. A method for capturing an image, comprising:
reflecting incoming light off of a primary mirror, wherein the primary mirror has a surface shaped as a section of a paraboloid having a single focus; and
redirecting the reflected light towards a sensor using a secondary mirror, wherein the secondary mirror has a surface shaped as a section of a hyperboloid having a first focus and a second focus, wherein
the secondary mirror is positioned so that the first focus and the single focus are proximate, and further wherein
the sensor is positioned near the second focus.

8. The method according to claim 7, wherein at least one of the primary mirror and the secondary mirror have surfaces with an aspheric component of at least third order.

9. A method for capturing an image, comprising:
reflecting incoming light off of a primary mirror, wherein the primary mirror has a surface which is not rotationally symmetrical and can be represented by a Zernike polynomial; and
redirecting the reflected light towards a sensor using a secondary mirror, wherein the secondary mirror has a surface which is not rotationally symmetrical and can be represented by a Zernike polynomial,
wherein the primary and secondary mirrors are positioned so that the angles of each mirror in relation to incident light is 45 degrees, and
further wherein the sensor is positioned near a focus of the secondary mirror.

10. The method according to claim 9, wherein one of the primary mirror and secondary mirror have surfaces which can be expressed by a Zernike polynomial, and the other mirror has a surface shaped as a section of a quadric surface of revolution.

* * * * *